US007528981B2

(12) United States Patent
Johnson et al.

(10) Patent No.: US 7,528,981 B2
(45) Date of Patent: May 5, 2009

(54) SYSTEM AND METHOD FOR REMOTE MONITORING OF PRINT SYSTEMS

(75) Inventors: Neil Johnson, Woodstock, IL (US);
Donald Schroeder, McHenry, IL (US);
Philip Sylvester, Palatine, IL (US);
Patrick Donigain, Janesville, WI (US);
Jonathan Dreyer, Lindenhurst, IL (US);
Matthew Condon, Gurnee, IL (US);
James M. Lafleur, Madison, MS (US)

(73) Assignee: Fujifilm Graphics Systems U.S.A., Inc., Hanover Park, IL (US)

( * ) Notice: Subject to any disclaimer, the term of this patent is extended or adjusted under 35 U.S.C. 154(b) by 0 days.

(21) Appl. No.: 11/741,168

(22) Filed: Apr. 27, 2007

(65) Prior Publication Data
US 2007/0263255 A1 Nov. 15, 2007

Related U.S. Application Data

(60) Provisional application No. 60/795,531, filed on Apr. 27, 2006.

(51) Int. Cl.
*G06F 3/12* (2006.01)
(52) U.S. Cl. .................. 358/1.15; 358/1.9; 358/2.1
(58) Field of Classification Search .................. 358/2.1, 358/1.15; 345/440
See application file for complete search history.

(56) References Cited

U.S. PATENT DOCUMENTS 6,327,677 B1* 12/2001 Garg et al. .................. 714/37
6,571,236 B1* 5/2003 Ruppelt .......................... 707/3
6,652,169 B2* 11/2003 Parry ............................. 400/74
6,704,012 B1* 3/2004 Lefave ....................... 345/440
6,757,714 B1 6/2004 Hansen
2003/0110413 A1* 6/2003 Bernklau-Halvor .......... 714/25
2006/0126117 A1* 6/2006 Stone et al. ................ 358/1.15

OTHER PUBLICATIONS

International Search Report and Written Opinion of the International Searching Authority for International Application No. PCT/US07/67602 dated Jun. 9, 2008.
Cenveo, Inc., Cenveo Reports on ColorScience Progress, Press Release, Aug. 31, 2005, Englewood, Colorado.
Colormetrix Technologies, LLC, Color Measurement Software for Densitometer & Spectrophotometer Data Collection & Analysis, Internet Product Brochure, 2008, Sussex, Wisconsin.
Colorsciences, LLC, CrossMatch Process Control System, Product Brochure, 2006.
Epson America, Inc., Epson and Colorsciences Combine Efforts Into Leading-Edge Remote Proofing Solution that Dramatically Reduces Time and Expenses Associated with Pre-Press Evaluations and Approvals, New Product Release, Sep. 7, 2005, Long Beach, California.

(Continued)

*Primary Examiner*—Mark K Zimmerman
*Assistant Examiner*—Miya J Cato
(74) *Attorney, Agent, or Firm*—Stroock & Stroock & Lavan LLP

(57) ABSTRACT

A system and method for remotely monitoring and servicing user's print system including the ability to diagnose a problem with a user's print system based on properties monitored from such system and creating a query that predicts the source of the problem based on past history for this print system and other user's print systems.

8 Claims, 17 Drawing Sheets

OTHER PUBLICATIONS

Colorsciences, LLC, Epson PrintCertification Solution from ColorSciences, Product Brochure, 2006.

Lawler, Brian P., Know Thy Enemy: Understanding Dot Gain and Its Effects, Article, Brian P. Lawler Electronic Edition, v.5, Jan. 23, 2007, San Luis Obispo, California.

X-Rite, Incorporated, The Color Guide and Glossary, Reference Guide, Feb. 2004, Grandville, Michigan.

LANDesk Software Ltd., LANDesk Management Suite 8.7—Installation and Deployment Guide, Instruction Manual, 2002-2006.

LANDesk Software Ltd., LANDesk Management Suite 8.7—User's Guide, Instruction Manual, 2002-2006.

X-Rite, Incorporated, A Guide to Understanding Graphic Arts Densitometry, Reference Guide, Dec. 2003, Grandville, Michigan.

* cited by examiner

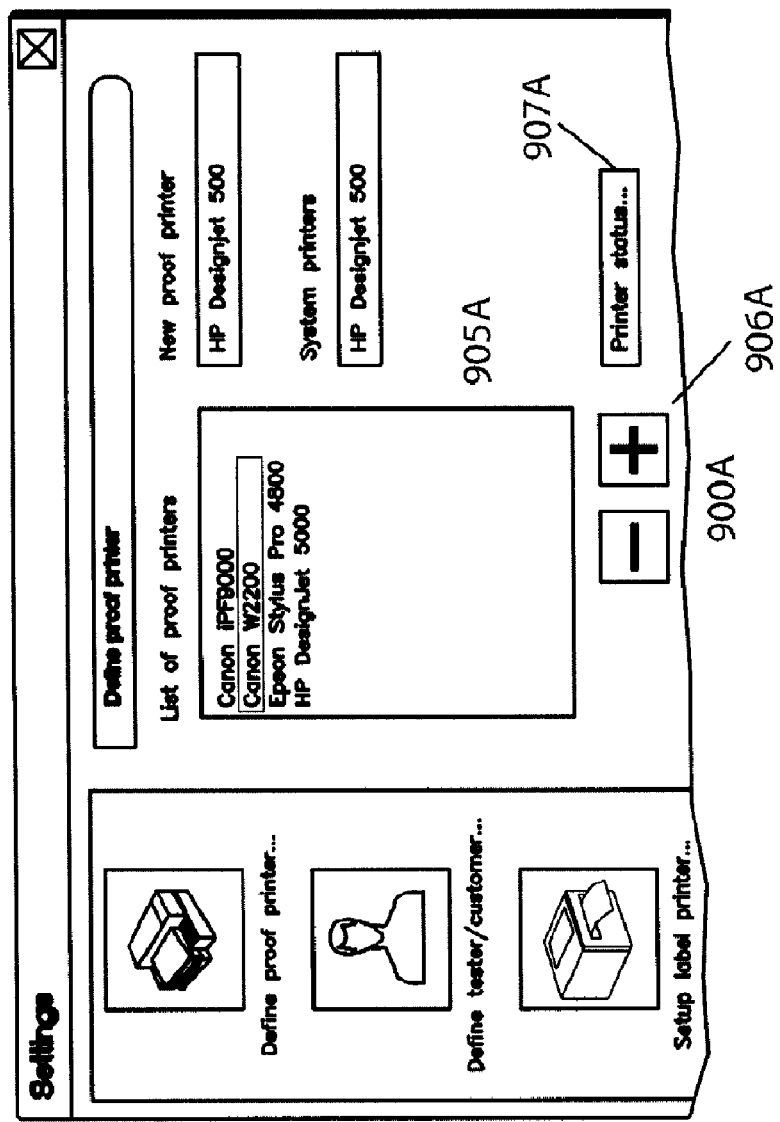

Comparison target Color / Actual Color

| Color | Field | Target Dot Area | Actual Dot Area | Deviation |
|---|---|---|---|---|
| | A1 | 0.00 | 0.00 | 0.00 |
| | A2 | 2.00 | 1.50 | -.050 |
| | A3 | 4.00 | 3.10 | -0.90 |
| | A4 | 6.00 | 4.90 | -1.10 |
| | A5 | 8.00 | 6.60 | -1.40 |
| | A6 | 10.00 | 8.80 | -1.20 |
| | A7 | 15.00 | 13.40 | -1.60 |
| | A8 | 20.00 | 18.20 | -1.80 |
| | A9 | 30.00 | 27.90 | -2.10 |
| | A10 | 40.00 | 38.70 | -1.30 |
| | A11 | 45.00 | 44.10 | -0.90 |
| | A12 | 50.00 | 49.30 | -0.70 |
| | A13 | 55.00 | 54.20 | -0.80 |
| | A14 | 60.00 | 59.50 | -0.50 |
| | A15 | 70.00 | 69.30 | -0.70 |
| | A16 | 80.00 | 79.60 | -0.40 |
| | A17 | 85.00 | 84.80 | -0.20 |
| | A18 | 90.00 | 89.80 | -0.20 |
| | A19 | 92.00 | 91.70 | -0.30 |
| | A20 | 94.00 | 93.80 | -0.20 |
| | A21 | 96.00 | 95.70 | -0.30 |
| | A22 | 98.00 | 97.40 | -0.60 |
| | A23 | 100.00 | 97.00 | -3.00 |

Tabs: Table | Graph

Buttons: Densities... | Help | Save... | Print...

Labels: 1401, 1402, 1403, 1404, 1405

SYSTEM AND METHOD FOR REMOTE MONITORING OF PRINT SYSTEMS

CROSS-REFERENCE TO RELATED APPLICATION

This application claims the benefit of U.S. Provisional Application Ser. No. 60/795,531 filed Apr. 27, 2006, entitled "A System and Method for Remote Monitoring of Print Systems," the entire disclosure of which is incorporated by reference herein.

BACKGROUND OF THE INVENTION

1. Field of the Invention

The present invention relates generally to systems and methods for remotely monitoring and servicing users' print systems.

2. Description of Related Art

Over the past several years, the printing industry has undergone numerous improvements resulting in improved printed products and services for customers. These improvements include the use of networks to help diagnose and treat problems with user's print related systems.

For instance, in certain systems, a company that had a printing press and/or other large scale printer, could have those printing components monitored via a network by a graphics company and be alerted if and when an error occurs or is generated by the component or any other component used in a printing system. In certain systems, this is accomplished by logging an error code generated by the printing component and alerting the user of the printing component that there is an error. In more advanced systems, this error code is sent over a network to another system that generates a message (e.g., an e-mail message) to be sent back to the user of the printing component indicating either the existence of the error or in certain situations a detailed description of what the error code refers to. Such a system gives the user of the printing component notice that there is something wrong with the printing component and allows the user of the printing component to try and rectify the error and/or contact qualified professionals that may be able to assist that user.

While these systems of error detection and notification have been an improvement to the field, they are still lacking in many facets. For example, although a user of a printing component will be made aware of the fact that an error has occurred, the printing system will not diagnose the complication based on the error code or troubleshoot the printing component to uncover the source of the problem. Although users of printing components can contact qualified professionals to troubleshoot the problem, such troubleshooting is often a lengthy process that results in significant down time for the printing system.

Accordingly, a need exists for an improved system, particularly a system that is able to both diagnose any problems that exist with printing components, or within the entire print production process across multiple print components of the print system, and at the same time allow the user of that printing component to begin troubleshooting for a particular problem, allowing the user to either find a solution to the problem or rule out other time consuming issues. Accordingly, there is a need for an improved system and method for remotely monitoring printing systems and addressing issues that arise in such systems. The present invention satisfies the foregoing, as well as other needs.

SUMMARY OF THE INVENTION

The present invention satisfies the foregoing and other deficiencies in the art. According to an embodiment of the present invention, a method of remotely monitoring a print system is disclosed. In one embodiment, the method comprises the steps of reading a property from a print proof, storing information about the read property in a database, comparing the read property with a set value, alerting a user of the print system when the comparison matches a certain value, comparing the comparison value with other stored comparisons, and communicating a solution via a chat interface to the user of the print system based on the comparison.

In another embodiment of the present invention, a method of generating resolutions to errors with printing systems is disclosed. In this embodiment, the method comprises the steps of monitoring a plurality of properties for a plurality of print systems, storing the monitored properties in a first database, determining a solution to an error condition in a first print system, storing the determined solution together with the monitored properties in a second database, searching the first database for the monitored properties when an error condition occurs in a second print system, and selecting a solution to the error condition in the second print system based at least in part on the stored determined solution of the first print system. In yet another embodiment of the present invention, a method of generating a graph related to print is disclosed. In this embodiment, the method comprises setting a high value and a low value for a first print attribute, setting a high value and a low value for a second print attribute, setting a tolerance level for the first print attribute, setting a tolerance level for the second print attribute, generating a graph with an x-axis that contains the first print attribute, and a y-axis that is based on the set tolerance values.

BRIEF DESCRIPTION OF THE DRAWINGS

A further understanding of the present invention can be obtained by reference to the embodiments set forth in the illustrations of the accompanying drawings. The drawings are not intended to limit the scope of this invention, but merely to clarify and be illustrative of embodiments of the invention.

FIG. 3 is a user interface according to an embodiment of the present invention;

FIG. 6 is a user interface according to an embodiment of the present invention.

FIG. 7 is a user interface according to an embodiment of the present invention;

FIG. 9A is a user interface according to an embodiment of the present invention;

FIG. 12 is a report according to an embodiment of the present invention;

FIG. 14 is a user interface according to an embodiment of the present invention.

DETAILED DESCRIPTION OF CERTAIN EMBODIMENTS

In general, the present invention relates to systems and methods for remotely monitoring a user's print system. As described in greater detail below, and as will be appreciated by those skilled in the art, the various embodiments of the present invention provide methods and systems that dynamically monitor printing systems permitting users of the printing systems to react swiftly and efficiently to overcome any problems that may arise in connection with such printing systems.

Figure 1:
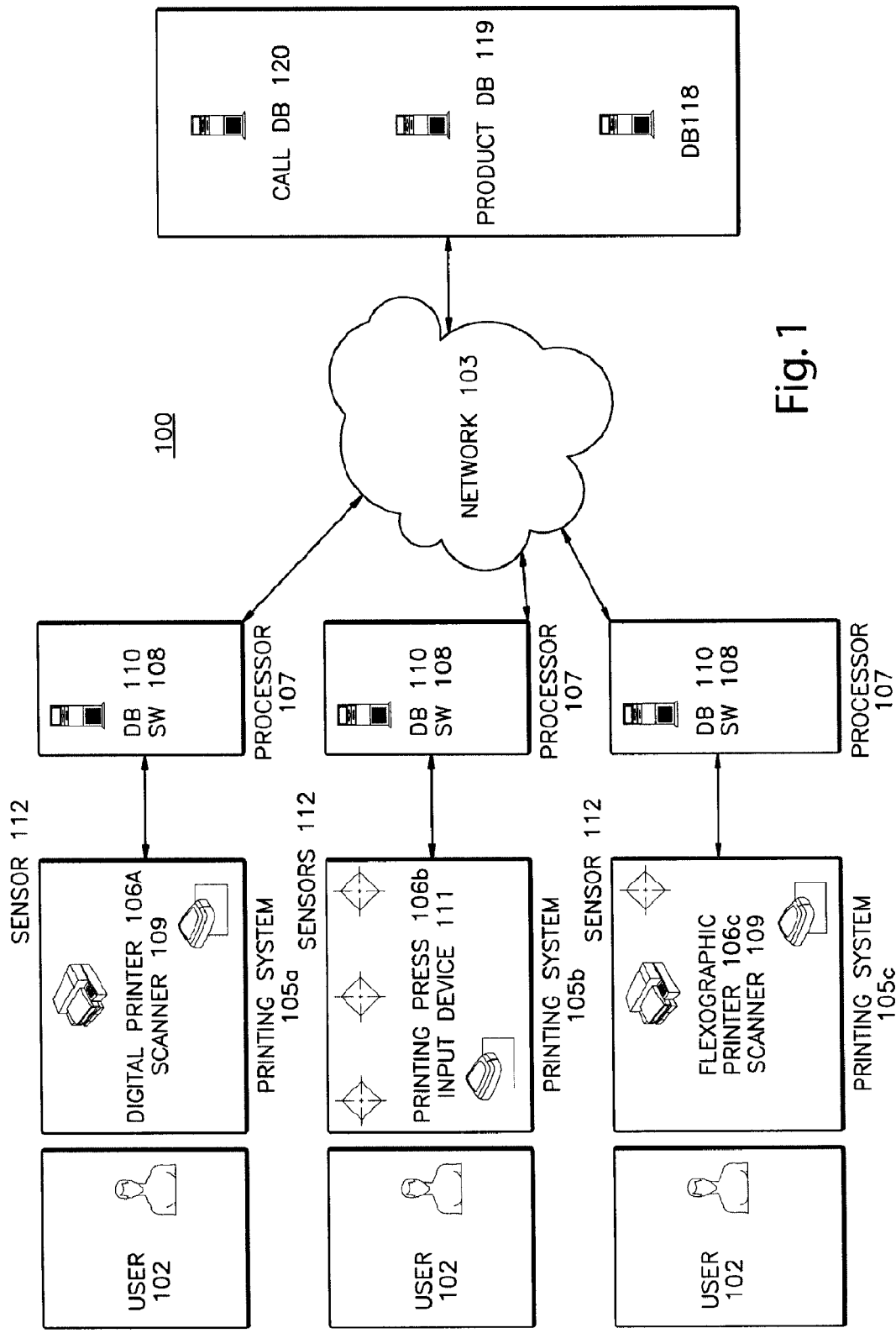
FIG. 1 is a schematic illustrating the system architecture according to an embodiment of the present invention.

Certain embodiments of the present invention will now be discussed with reference to the aforementioned figures, wherein like reference numerals refer to like components. Turning first to the schematic of FIG. 1, a system 100 according to an embodiment of the present invention is shown. In general, the system 100 allows users 102 who are connected to a server 104 via a network 103 to more efficiently manage their printing system(s) 105.

Each of the users 102 has a processor 107, such as a personal computer (PC), and a printing system 105 which are typically located in close proximity and are coupled to each other by any number of known communication means. Users 102 can include for example a publisher, a textile maker, a paint manufacturer or any other user who needs to monitor a printing system. User 102 can also give other users such as employees, managers or contractors who need access to the data that will be generated by system 100 as will be explained in more detail below.

In an illustrative system, printing system 105 consists of one or more printing components, such as a digital printer 106a, printing press 106b, flexographic printer 106c and/or other components used in printing functions. Printing system 105 also contains various components that enable the printing process such as input measurement device 109, which can be a scanner for example or other input devices 111 as well as various sensors 112 that detect certain properties on the printing components 106 of other components of the printing system 105. Examples of input devices 111 can include the PDC-S Spectro Densitometer manufactured by Komori Corporation. For example input measurement device 109 can be a manual reading device such as a hand held scanner or plate dot reader or can be a semi or fully automated measurement device as are well known in the art. Examples of such input measurement devices 109 include Eye-One-Photo measurement devices manufactured by X-RITE Inc., and IC Plate II manufactured by Gretag Macbeth Inc. Measurement of color properties is more fully described in "The Color Guide and Glossary" published by X-RITE Inc. also located at www.xrite.com and the "Fundamentals of Color" published by Gretag Macbeth Inc. both of which are incorporated herein by reference. The processor 107 operates according to a software program 108, which is able to monitor a printing system by using sensors in the printing system for checking the status of each component and/or monitoring numerous properties of components of the printing system and/or printed materials that come from the printing system to check for their accuracy and quality. These properties can include, for example, performance properties such as hardware or software performance, consumable performance data, measured color data (whether reflective or emissive) and/or other performance properties; environmental properties, which can include heat, cooling, humidity and/or other environmental properties of the environment of the printing system 105; electrical voltage; mechanical properties which can include vibration, error codes, heat, speed, temperature, repeatability-calibration and/or other mechanical properties of the system or components; raw materials properties which can include film, toner, fluids such as fountain solution, donor, pigment, aluminum, water, processor, press chemistries and/or other properties descriptive of raw materials used in the system 105. The scanning of these properties can be performed by user 102 or by others in proximity to the printing system such as a prepress operator, designer, printer or operator or quality control (QC) operator. Although illustrative embodiments will be discussed in terms of specific properties (e.g., color data), this invention can also be utilized with any of the above listed properties and/or other properties related to a printing system that are now known or to hereinafter become known.

As was mentioned above, properties that can be measured include various types of fluids including, but are not limited to, fountain solution, and fountain solution components such as alcohol or an alcohol substitute, and printing plate developer solution. As is known in the art, fountain solution is used on a printing press to help keep the non-image areas of the printing plate clean and free of ink. If fountain solution is not maintained, it can result in a change of color of the color output of the press. Alcohol or an alcohol substitute is a fluid to assist the fountain solution in keeping the non image areas of the printing plate clean. Plate developer solution is the fluid used to develop the image which has been exposed on the printing plate. Each of these fluids has a known measurement which maintains an expected performance that is integral to maintain the proper benchmark of the color system. In an embodiment, conductivity, which is the measurement of dissolved solids in a fluid, is used to measure the proper mixture of fountain solution. Conductivity can also indicate the point at which fountain solution is considered "exhausted" and needs to be changed. The amount of fountain solution additives, such as alcohol or alcohol substitute, can alter the conductivity and indicate an error in the mixture of the fountain solution. The measurement of conductivity can also be an indicator of a problem with the fluid. A quick increase of conductivity for example can indicate problems with the printing press and/or the fountain solution. The measurement of conductivity is also used in maintaining the stability of the plate developer solution. When the plate developer solution is freshly mixed there is an expected conductivity number that is measured. As the plate developer solution is used, the conductivity needs to be maintained to the original measured value, by means of a process called replenishment. If the replenishment of the plate developer solution is miscalculated, this can cause unexpected development of the printing plate. The mis-developed plate can thus have a negative impact when measured against the color benchmark of the system. Measurement of the conductivity of the plate developer solution can be one indicator to show the stability of the plate development process. The temperature of the fountain solution and plate developer solution can also be measured to gain an understanding as to how the each fluid is performing. For example, if the temperature is too high or too low, the reactivity of the fluids will either be too aggressive or not aggressive enough and swings in temperature will cause negative impacts to the benchmark of color on the resulting output. Monitoring the temperature of the fountain solution and the plate developer solution can also assist in helping the customer solve the root cause of their color benchmark being measured out of tolerance.

As will be explained in more detail below, each processor 107 additionally contains a database 110 with information relating to the printing system 105 to help determine whether the various components of the system 105 are working properly. This information can be in the form of technical information about the printing system, including acceptable levels of certain properties, as well additional information about the most common factors that should be considered when dealing with properties that are either out of an acceptable benchmark range and/or products that are not produced to the expectations. For example, database 110 contains information about the users 102 of the printing system 105, the components of the printing system, benchmark values for various properties of the printing system, which describes an acceptable condition of a physical consumable or device, as well as some of the more common solutions to errors that may occur in the printing system. Database 110 stores the most recent data about the printing system 105 to enable a basic local analysis of the data without the need to connect to the server 104.

Although various known structures can be used for the databases of the present invention, database 110 preferably has an architecture of a fully relational product using, for example an SQL database format with a basic structure wherein data is stored within tables and these tables are logically divided in rows and columns. Database 110 can have tables which a) maintain user 102 information, b) maintain specific information about the devices on the printing system 106, c) store benchmark and tolerance ranges, and d) track the most recent measurement data and data related to the success or failure of measurement comparisons to benchmarks. The main purpose of database 110 is to allow for system operation during periods where connectivity to the server 104 and/or database 118 is not possible.

Figure 7:
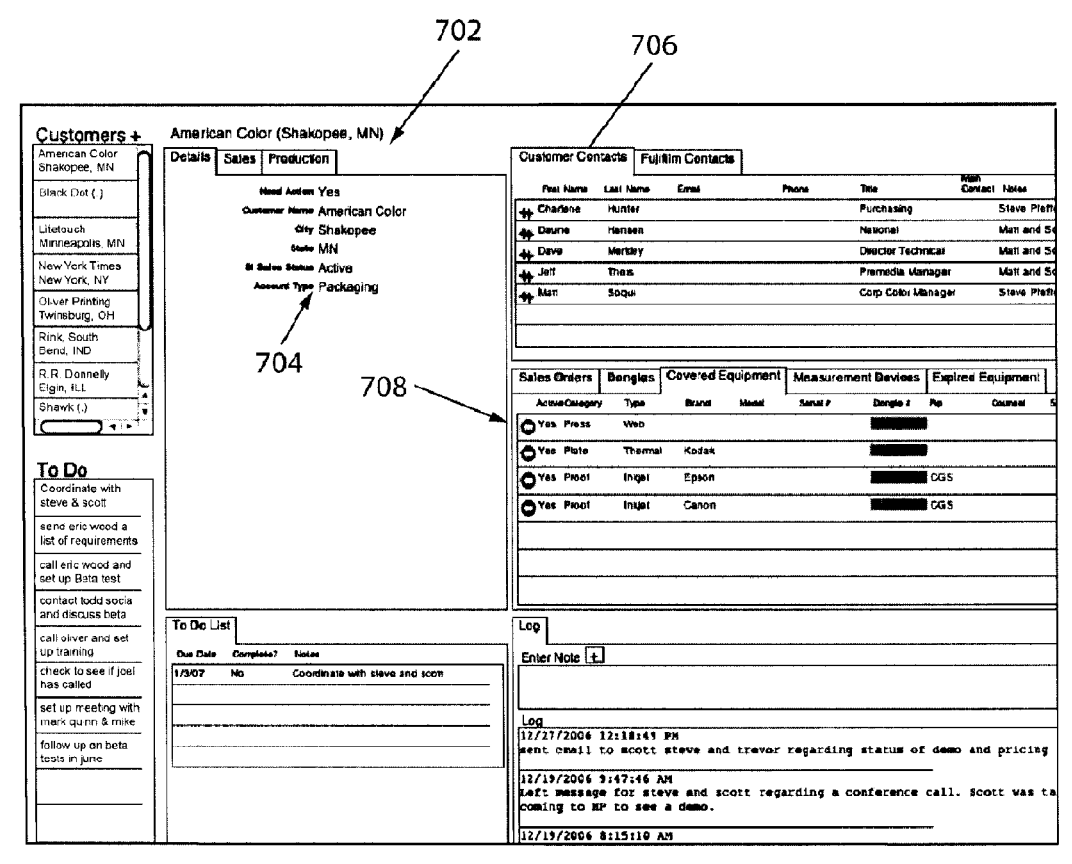

FIG. 7 shows a display of information according to an embodiment of the present invention available from database 110 about a specific customer. As can be seen in FIG. 7, the customer's name and location 702 are displayed. Additional details about customer 704 are also shown. These details can include details about whether additional action needs to be taken with regard to this specific customer; location of the customer and/or what specific account type the customer belongs to. Additional fields that may be available from database 110 can include customer contacts 706 which gives a listing of names of contacts at the user, their specific titles and who they are connected with. Additional lists that can be gathered from database 110 include a listing 708 of components 106 or other devices that are at user 102, as well as details about the specific printing systems 105. Thus, even if connection to the server 104 and/or database 118 are not possible, the user or a technician at the user's location can access this information related to the user 102 and the printing system 105 being used by such user so as to troubleshoot and/or diagnose any issues that exist.

The server 104 also communicates with a database 118, which contains information about each of the various users 102, as well as each printing system 105, in order to maintain a historical and an up-to-date compilation of information received from or related to the various printing systems 105. The database 118 is intended to be identical to or closely mirror the basic format of the local database 110. The structure of tables and keys are identical between these databases to allow for timed interval cloning of the databases to occur as well as make the passing of data and information between the databases more efficient. A difference between database 118 and database 110 in some embodiments is that remote database 118 maintains long term information storage of all tracked conditions while the local database 110 preferably stores data for a more concise period of time (e.g., the last 24 hours). Additionally, unlike local database 110, which stores information about that specific user, remote database 118 preferably stores data about all user locations.

Figure 10:
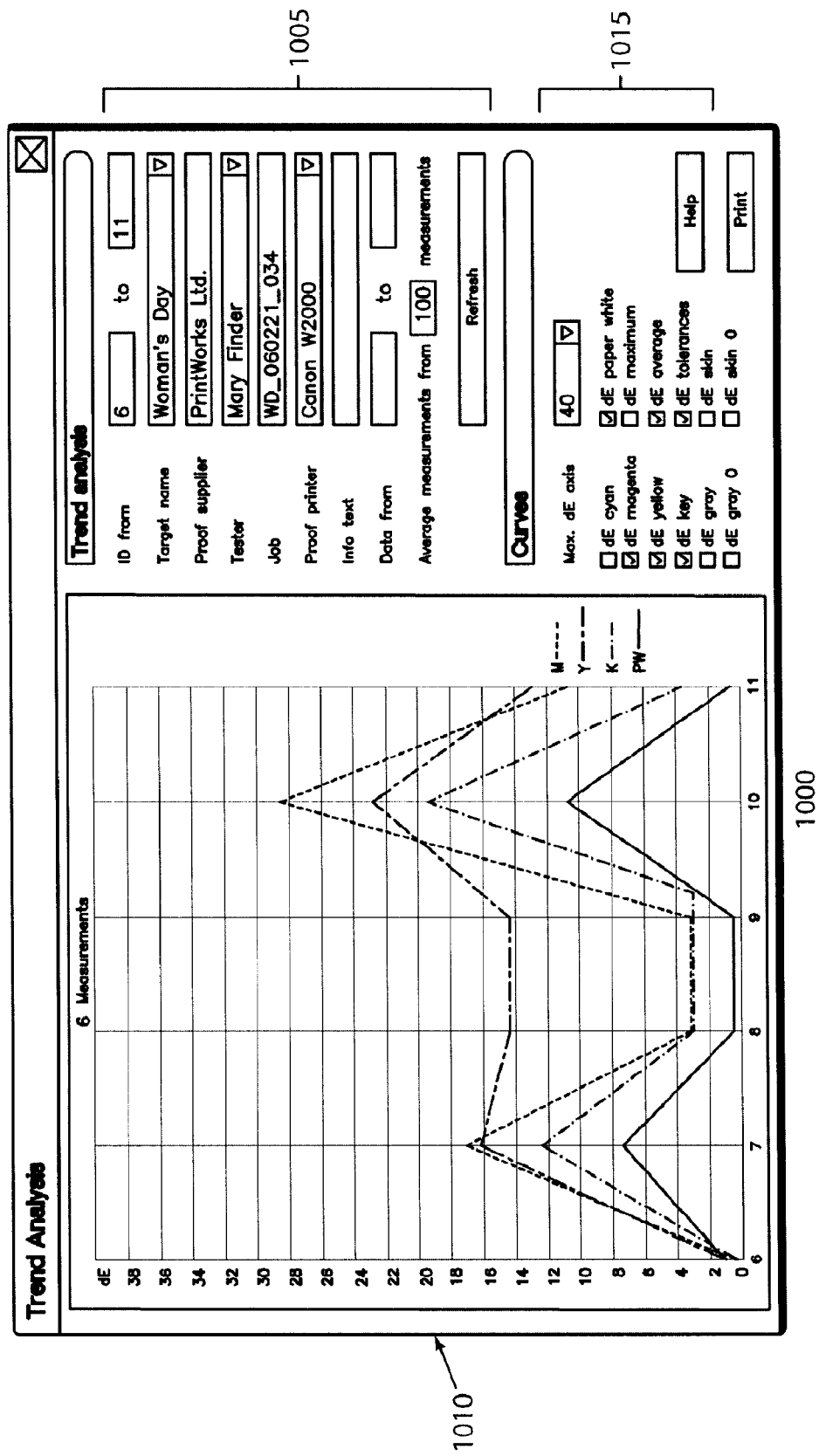
FIG. 10 is a user interface according to an embodiment of the present invention.

Remote database 118 may include further information, such as trend information learned across multiple print systems 105 as will be discussed in more detail below with regard to FIGS. 8 and 10. In an embodiment of the present invention, access can be given by user 102 to other users such as their customers or affiliated companies to such performance and trend analysis which allows such users to check historical performance and improvements to the printing system.

In order to compile the information in database 118, the server 104 receives information and data from the printing system 105 that shows different values for different properties of the various components of the printing system at different times during the day. This information and data can be received continuously, or periodically (e.g., in response to certain events, polling signals or when pushed by the processor). Thus, for example, the server 114 may receive information at a certain time interval (e.g., every hour on the hour) from the printing component 106 that shows the status of the printing component 106 and different properties of the printing component such as color quality. Alternatively receipt of information can be done at some random time, which may be a different time on different days of the week, or different weeks of the year. Information can also be provided upon the occurrence of an event, such as any occurrence of certain or any error codes. This information is used when an error condition exists in a printing system, and based on the information stored in the database 1118, the server 104 isolates when the error occurred and identifies the circumstances surrounding that error.

The server 104 also can contain a product database 119, which stores information on specific systems 105 and/or components thereof and the known issues and related solutions. As issues are defined and solutions created, additional entries are made directly to product database 119. Indexing of this data can occur either with tools designed to optimize the data or by weighted tables to determine the best solutions to known issues. An example of a weighted table is to perform a search, for example, based on frequencies of the search terms in the data being searched. Such a search produces for instance a numerical score for each match. A score can depend on the frequency of each search term in that data compared with the overall frequency of that item in the entire database.

Once an error is detected, that information is also stored in database 119 so that the server 104 can compare that error to known issues and related solutions stored in database 119 and compute the most likely cause of the error. For example, if a color sensor on the printing component 106 reads a color number that is below the benchmark value stored in database 110, processor 107 would send the data to server 104 in a data packet in an XML format or other known method of transferring data packets. The data packet would consist of a printer identifier that would identify the printing system and/or printing component that was encountering the error. Additionally, the data packet would also contain the color value that was deemed irregular, a time stamp that would indicate when the reading was taken, and other data regarding the printing system and/or printing component, (e.g., environmental, electrical and mechanical properties). After receiving the data packet from the processor 107 indicating an error with the printing system, the server retrieves the information from database 118 which has the expected color value for the printing system and the previous color values for this particular printing system as well as information about when the last time the paper or toner for the printing component was changed. Based on that information, a determination is made as to probable cause(s), for instance, that the most probable cause of the error was that the paper, which was recently loaded in the component, was loaded incorrectly. Alternatively, based on the toner data (e.g., low toner) received from the processor 107 and the data already in database 118 (e.g., time toner was last replaced), it may be determined that the toner is the most likely cause for the error. Additionally, the server 104 determines the difference between the measured value and the benchmark and based on prior history with similar printing systems can send a possible solution to the user. Alternatively, the data packet can contain status information about the printing system generated by software installed on Processor 107 or by other hardware that monitors the printing system.

Figure 8:
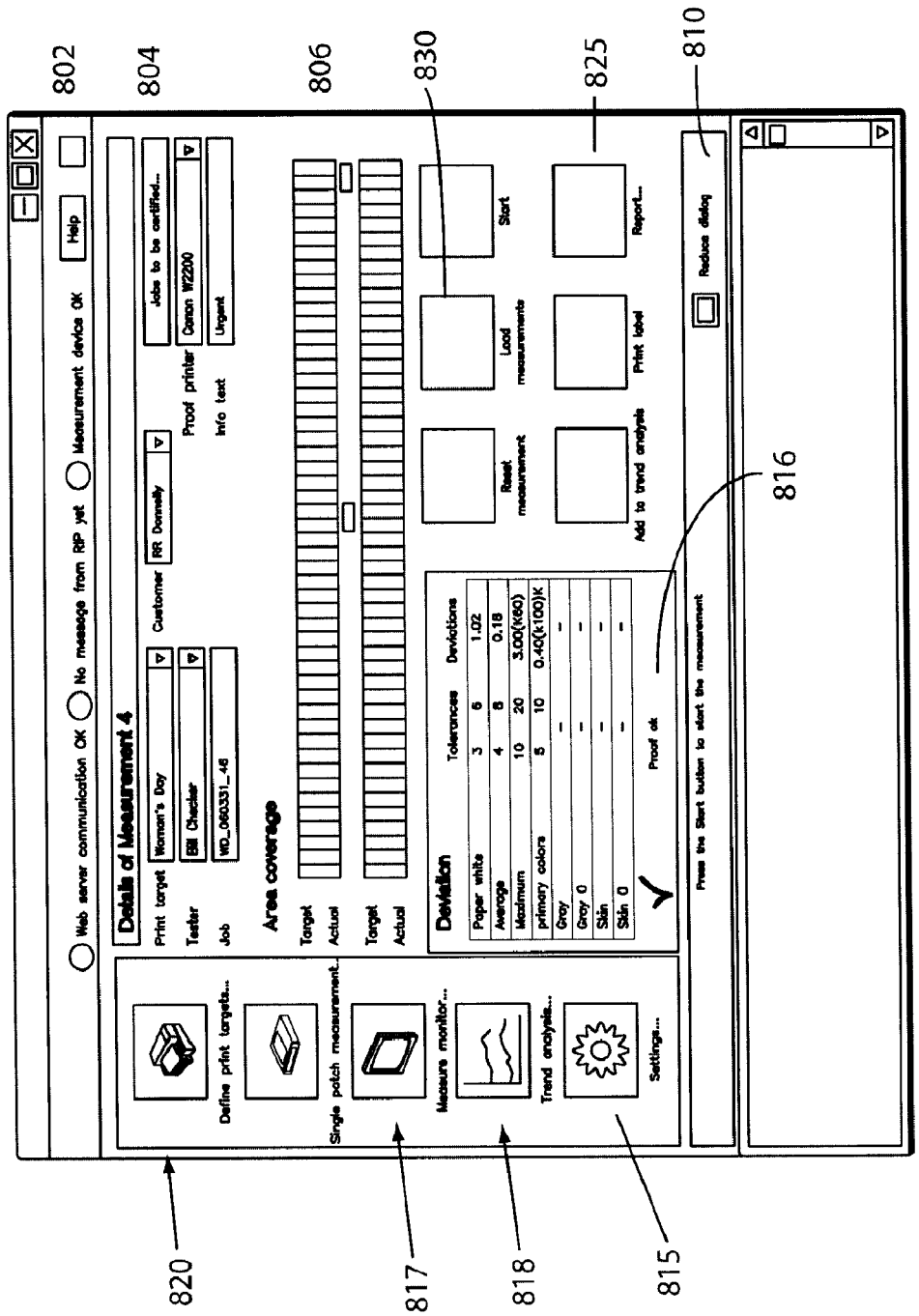
FIG. 8 is a user interface according to an embodiment of the present invention.

An example of a user interface 800 for user 102 that is used to help track the measurement and monitoring for printing system 105 is shown in FIG. 8. Display 800 allows a user 102 to easily track the different color values being read from their printing systems 106 as well as perform other functions discussed in more detail below. In display 800, Pane 802 displays for the user whether the communication with network 103 has been established, whether any messages have been sent through the print system 100 and whether there are any additional issues with their printing device 106. Pane 804 displays for the user details about printing device 106 and/or about the last time such device was checked and by whom. Pane 806 displays for the user different color values as will be explained in more detail below. Button 810 allows the user to display a smaller version of the display 800, which eliminates some less used functions that can be activated from display 800. Certain actions that can be performed by user 102 from display 800 will now be discussed in more detail.

Figure 9:
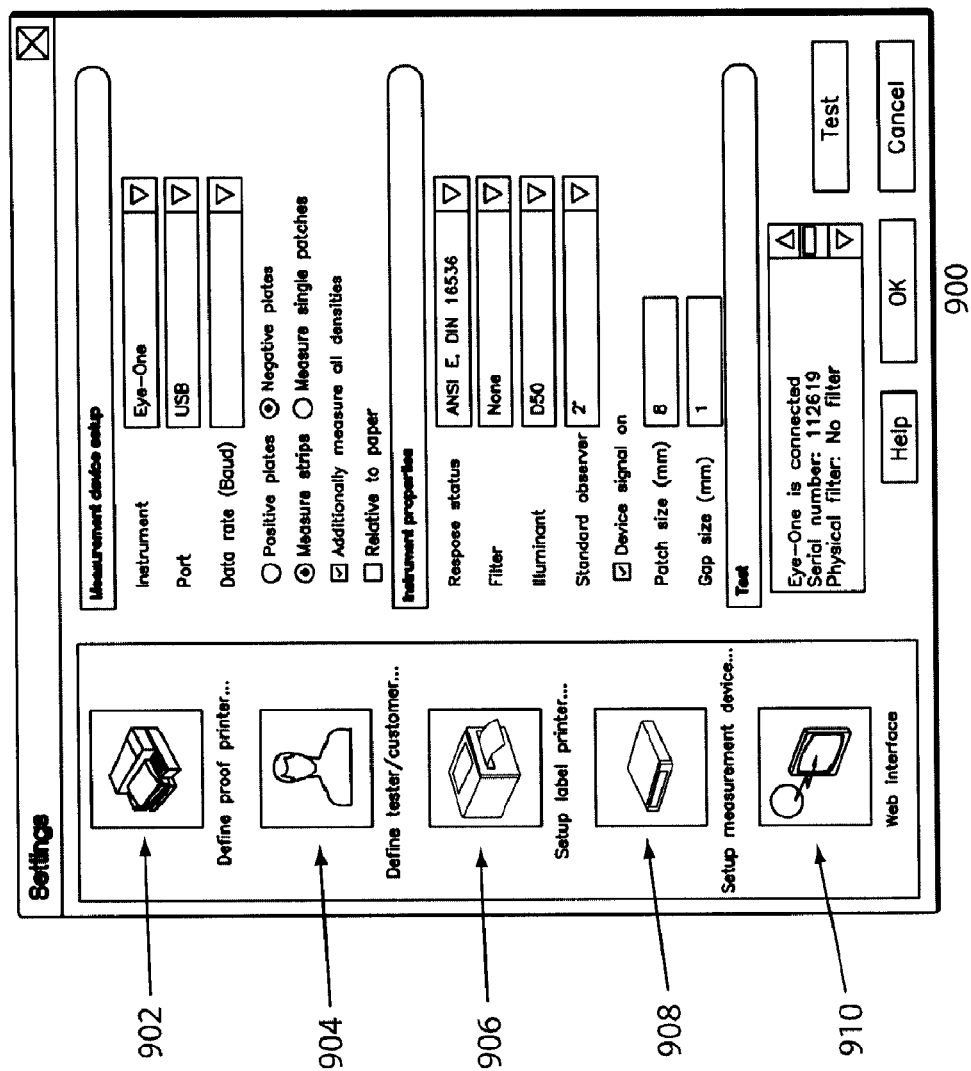
FIG. 9 is a user interface according to an embodiment of the present invention.

FIG. 9 shows an example of a display that is activated for the user when a user clicks or selects the settings icon 815 from display 800. As can be seen in FIG. 9, display 900 enables a user to better manage the settings related to their print system 105. When the user clicks or selects button 902, he or she is able to create a list of proof of printing devices that can be later used for reports or analysis. Once a user clicks or selects icon 902, a display 900A, such as is shown in FIG. 9A, is generated and displayed for the user to indicate and activate any printing components 105 that the user 102 wants to be monitored by system 100. A listing 905A shows any printing devices 106 that are connected to the users system. From display 900A, a user can either add a printer that he or she wants to be monitored by clicking or selecting icon 906A or find out the status of such printer by clicking or selecting icon 907A.

From display 900, user 102 can also create a list of persons who will be performing the measurements or in other words testing the print component 106 by clicking or selecting icon 904. These names will later be displayed for the user in display 800 and will be used for reports and analysis. From display 900, the user can also set up, configure and test a label printer by clicking or selecting icon 906 or select, configure and test a measurement device by clicking or selecting icon 908. Lastly, a user 102 from within display 900 can configure the address of the web server to which measurements will be sent by clicking or selecting icon 910.

Figure 10A:
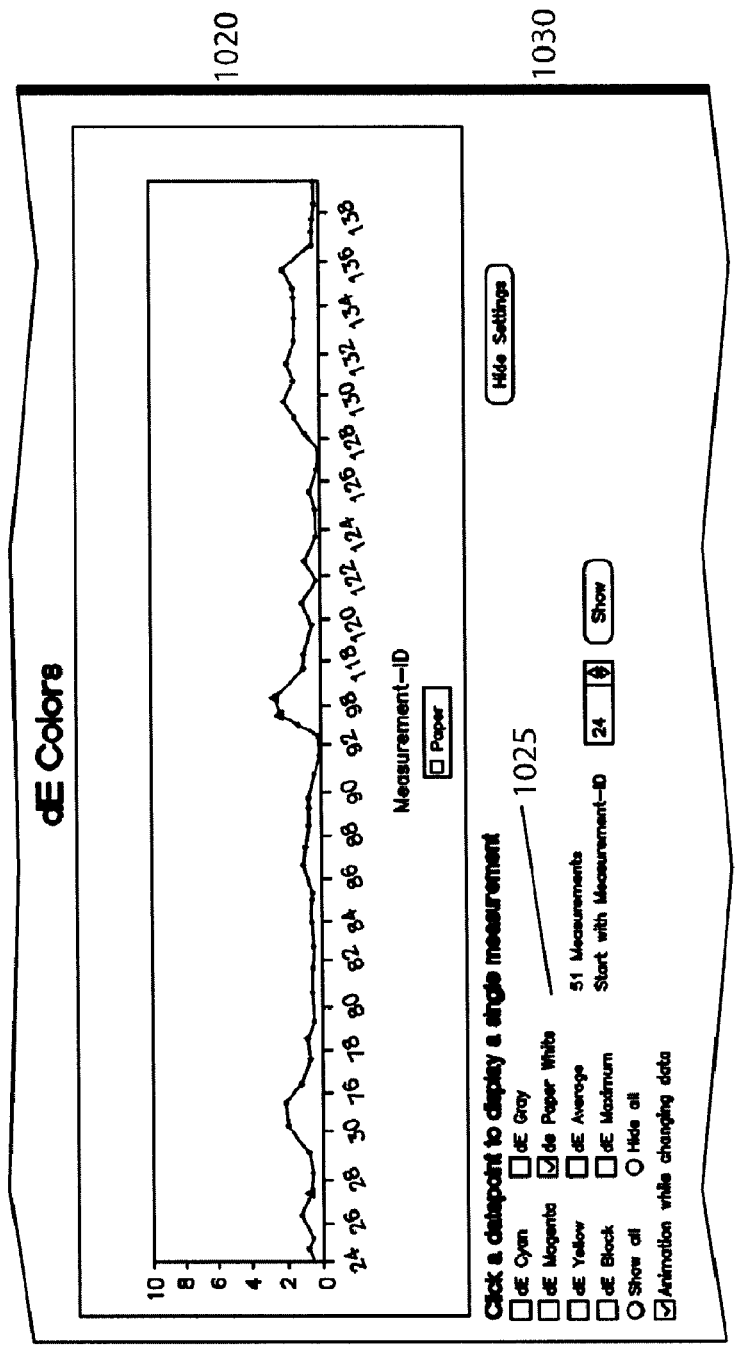
FIG. 10A is a graph according to an embodiment of the present invention.

Referring back to FIG. 8, from within display 800, the user 102 can also keep track and analyze visual color measurements as well as control color variations over time by clicking or selecting the trend analysis icon 818. When a user 102 clicks on the icon 818, a display 1000 is preferably displayed to the user 102 to perform a trend analysis. As can be seen in FIG. 10, graph 1010 shows the user 102 different trends based on color measurements taken over a certain period of time from a certain printing device 106. Display 1000 also shows in pane 1005 details about which printing device 106 is covered by graph 1010 and which period of time or periods of testing are covered as well. From pane 1005, a user can select which measurement should be included in the graph 1010. For example, the identification numbers of the measurements can be selected, as well as a specific printer device 106 and a particular date range to graph. Additionally, a user can select to plot any number of properties together on the same graph or limit the graph to a single property by selecting or deselecting specific properties from pane 1015. It should be appreciated that this provides the user 102 with increased flexibility in tracking trend analysis or any particular printing device over any period of time. In an embodiment of the present invention, the trend information includes data plotted about density print contrast, and dotgain. Dotgain is the effect of halftone dots growing in area between the original film and/or plate to the printed sheet. As is known in the art, dotgain is a result of the spreading of ink that is not properly absorbed into the paper or by ink spreading outside of a certain area on its paper against a standard. Viewing the trend information, the user has the ability to choose any specific point in the graph and separately view and/or analyze that data. An additional trend graph 1020 as is shown in FIG. 10A can also be generated by server 104 to include performance data over a longer period of time. As is shown in FIG. 10A, the graph shows the trend over a period from read 24 through read 138 and shows that there was some deviation in the paper reading near read 98. As can be seen in FIG. 10A, the graph 1020 is limited to showing only the measurements related to the paper by selecting the "paper button" 1025. Alternatively, a graph could be generated to show any number of properties by selecting or deselecting specific properties from pane 1030. In an embodiment, if a data point on the graph is selected, additional information about that data point will be displayed. Thus for example if the graph shows a deviation at a particular point (e.g., read 97), a user can click or select that data point from the graph to see additional information about the measurement to help determine why such a deviation may have occurred.

Figure 11:
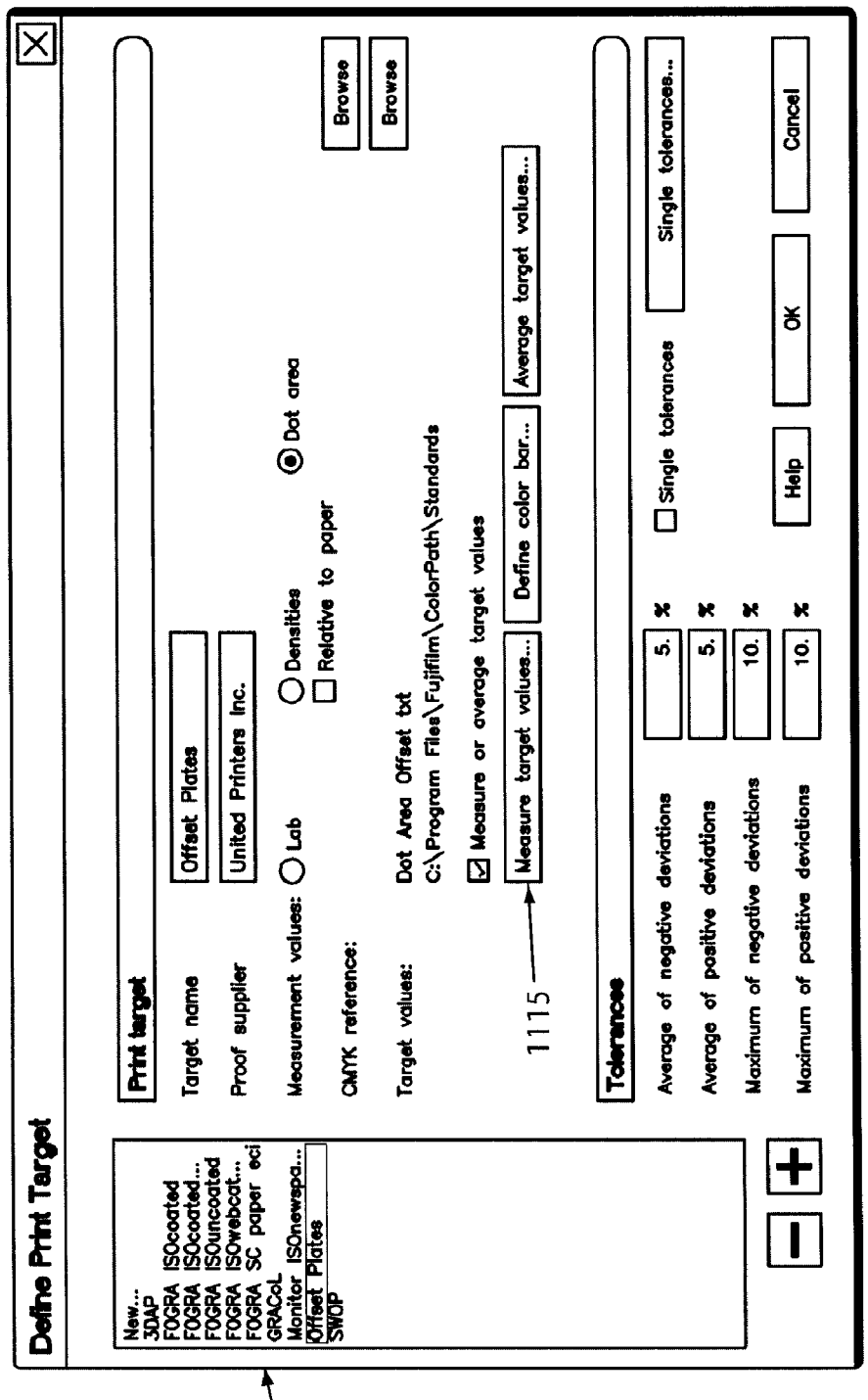
FIG. 11 is a user interface according to an embodiment of the present invention.

Additionally, from display 800, user 102 can define and create a print target by clicking or selecting icon 820. The "print target" defines the dot area values that are to be verified on a printing plate, the target values, and the allowed tolerances. As will be discussed in more detail below, system 100 uses these print target values to locate and diagnose errors. The values will enable the system to know when an error condition exists and requires attention. In an embodiment of the present invention, in order to create a print target value, user 102 clicks or selects on icon 820 to cause the display of display 1100 as is shown in FIG. 11. To set a new print target, the user 102 would click on or select "new" pane 1105 and then enter the target name, supplier, measurements values and other information about the measurement that is being used as the print target. Additionally, the user is able to set tolerance values to set deviations that are acceptable to the user 102, as will be discussed below. System 100 uses these tolerance values to classify any deviation and whether such deviation is acceptable to a user, as will be discussed in greater detail below. In alternate embodiments, it should be noted that different tolerance levels as well as tolerance for different properties can be tested. For example, user 102 can set a tolerance value regarding a specific paper being used.

Figure 6:
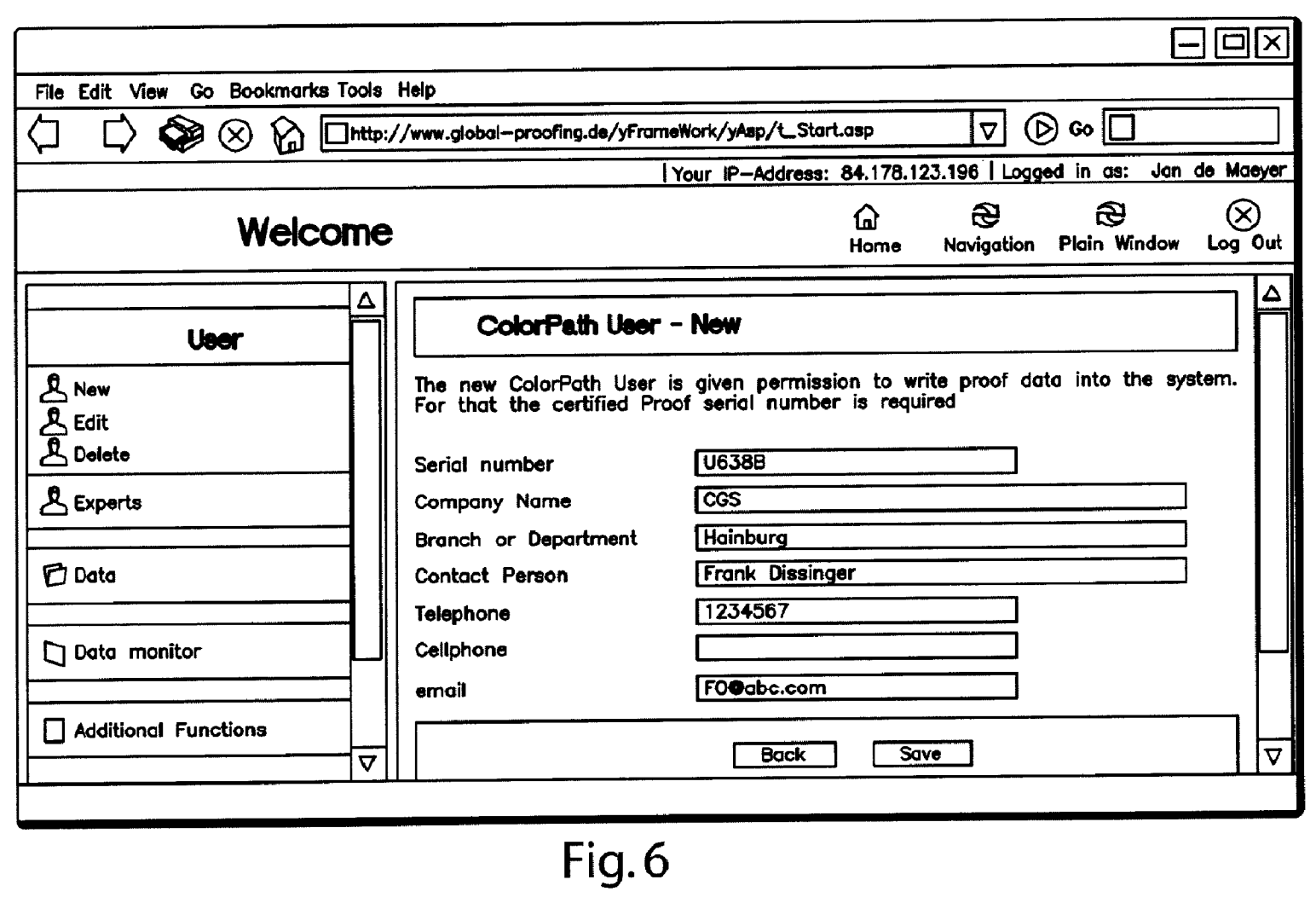

In an embodiment of the present invention, a web interface is created for user 102 and allows a user to set up particular other users who can either test printing component 106 or otherwise monitor such components as well as have access to certain data generated through printing components 106. This can be seen in FIG. 6, a display is generated for a user 102 where new users can be added and give information to write, proof data or other measurements data about the users print system to system 100.

Figure 12:
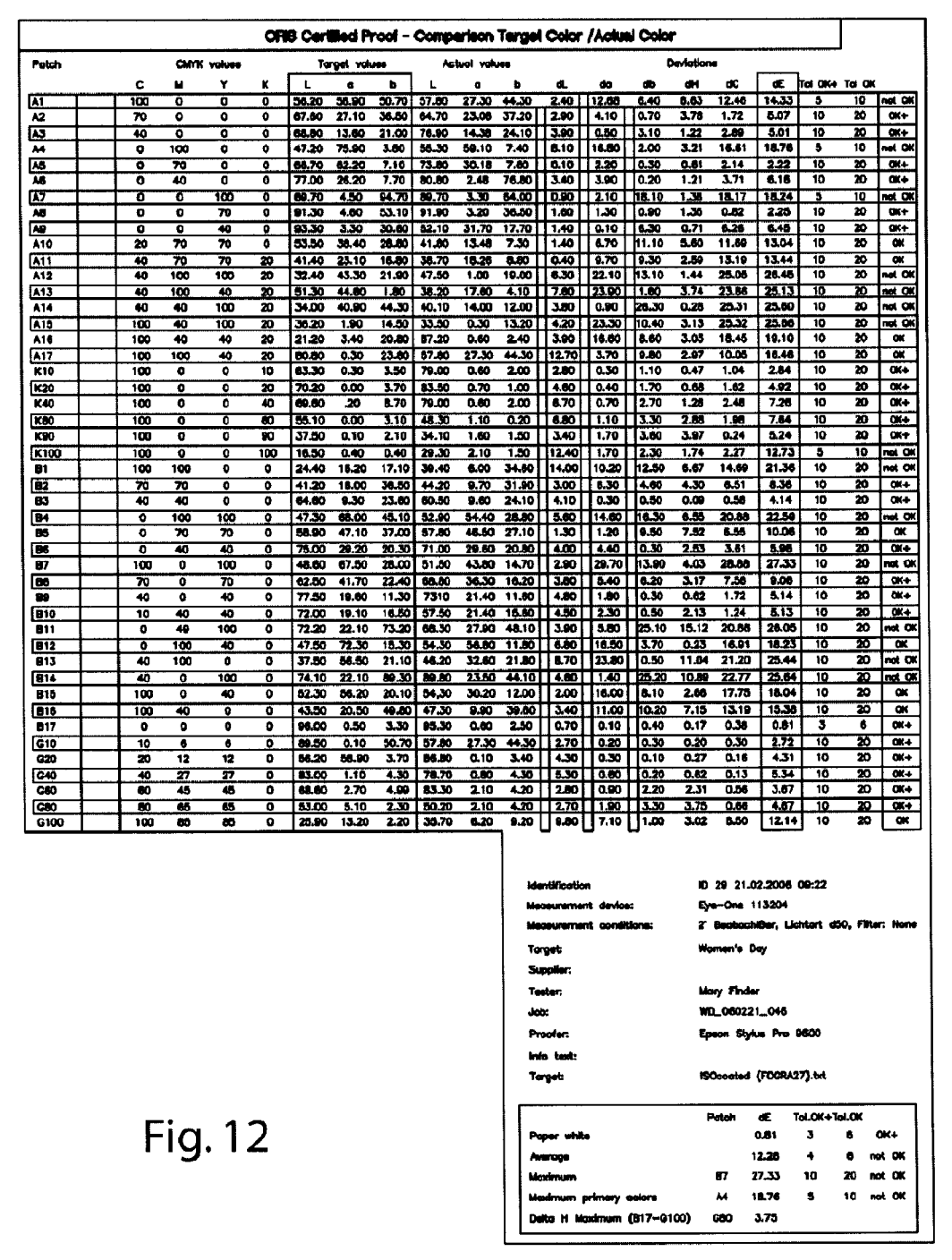
Figure 13:
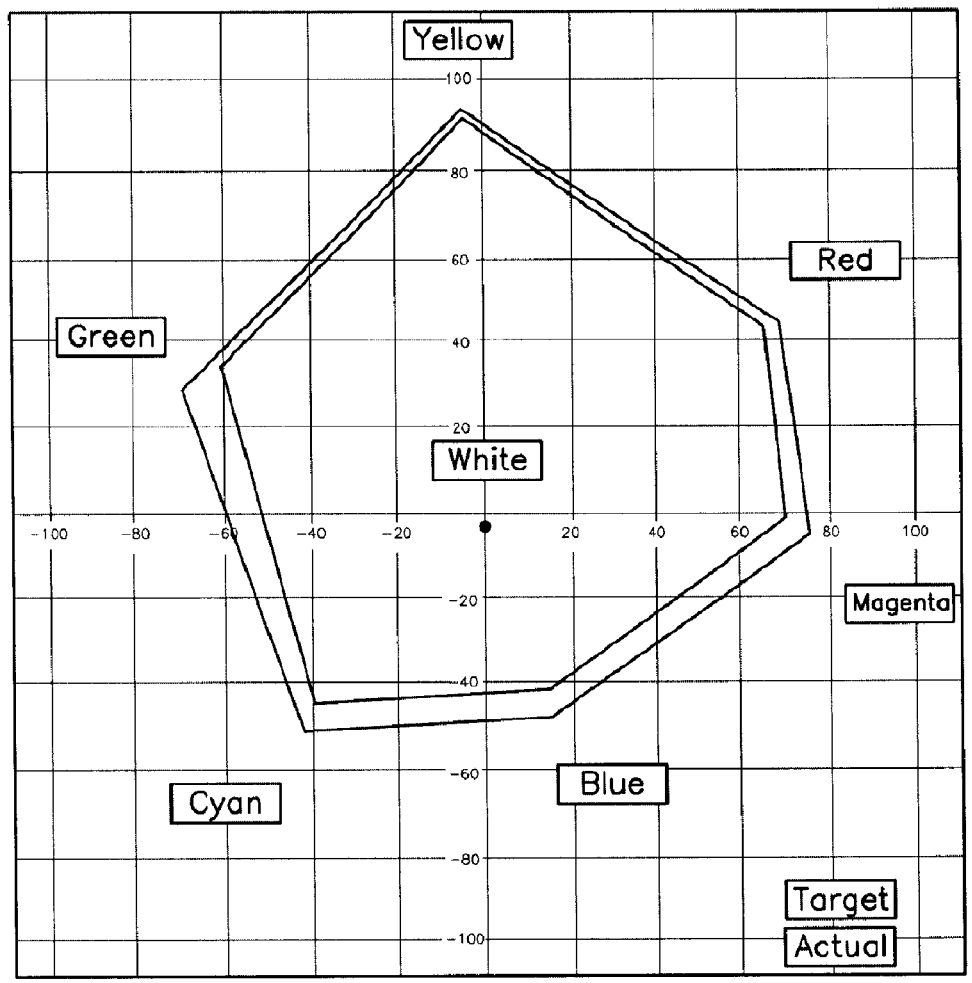
FIG. 13 is a graph according to an embodiment of the present invention.

From display 800, the user can also access reports related to there print system by clicking or selecting icon 825. After clicking or selecting icon 825, a report sheet such as for example seen in FIG. 12 is displayed for user 102. As will be explained in more detail below, these reports are based on color measurement and can vary in content as well as detail. An additional report according to another embodiment to present invention, which displays the data as a color graph, is shown in FIG. 13. As can be appreciated by someone of ordinary skill in the art, FIG. 13 graphically compares a target against an actual color measurement showing in an easy to understand format any deviation that may have occurred in the measurement.

Figure 11A:
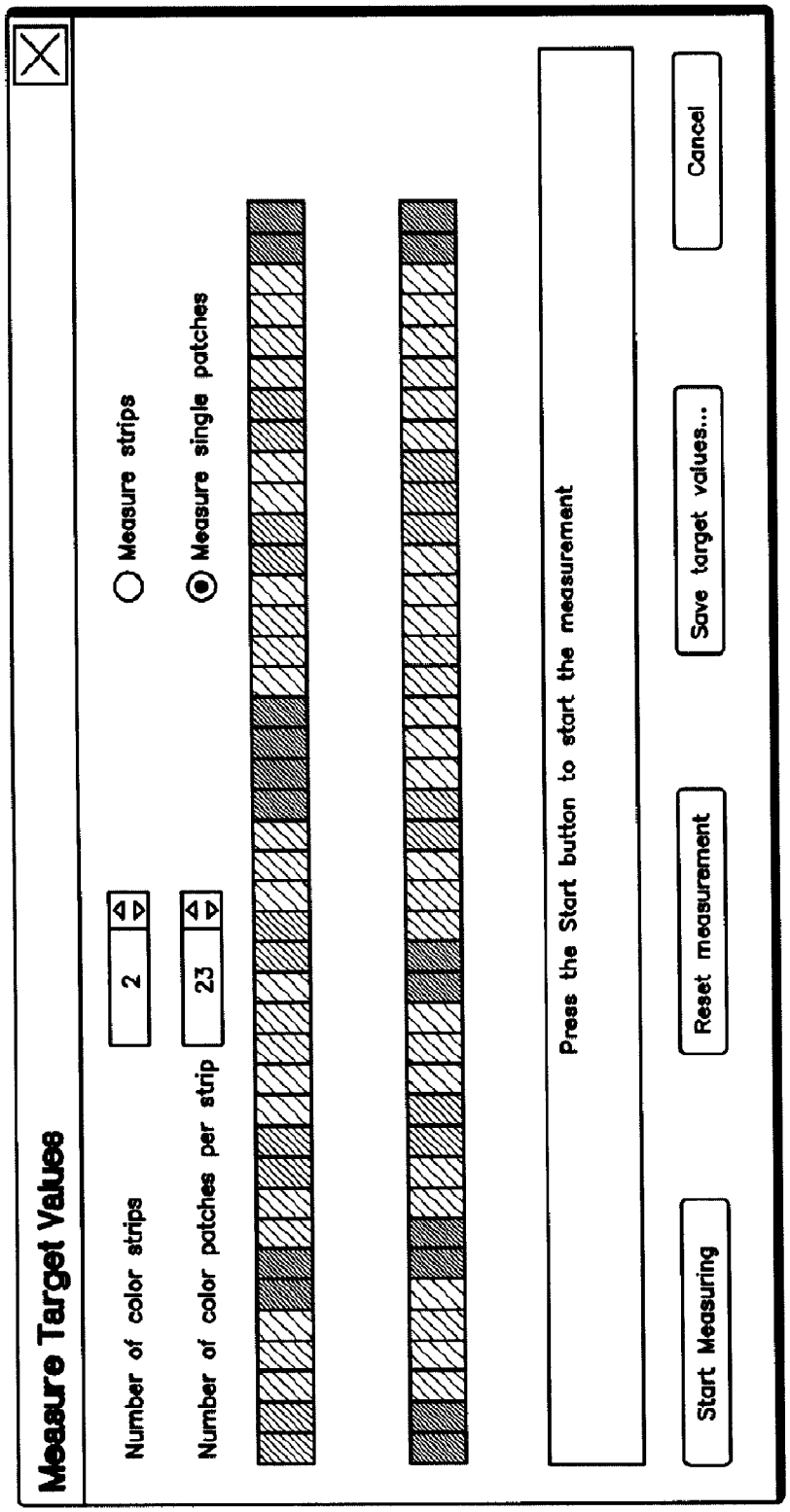
FIG. 11A is a user interface according to an embodiment of the present invention.

To measure a target value, a user would click or select icon 1115 from screen 1100 to generate the display 110A, as shown in FIG. 11A. As can be seen in FIG. 11A, user 102 has the ability to start measuring target values through the use of color strips, once color values have been measured, a user can through display 1100 view average target values for more than one measured value. Alternatively, instead of measuring a target value, a user can load a specific measurement file and use that as a target value by clicking or selecting load measurements icon 830 from display 800. Once a measurement is performed using input measurement 109, the status of such measurement is shown in pane 816. This value can either be an indication that the proof is "ok" or that the proof "is out of tolerance". The information is then transferred via the network 103 to server 104 for storage. If data has been transferred properly, display 800 would an display an indication showing that the data has been transferred. If there is some error in the data transfer an indication would be sent to the user accordingly as well. If there is an error code indicated in the measurement, a chat window as discussed in FIG. 3 below may be implemented as well.

Additionally, after clicking or selecting the report icon 825, a user can retrieve a table locally of results a sample of which is shown in FIG. 14. As can be seen in FIG. 14, the table of results shows the individual color of column 1401, the field from which such color was measured, (column 1402), the target dot area taken from the print target in (column 1403), actual dot area taken from the print being measured in (column 1404) and the deviation (column 1405).

In an embodiment of the present invention, the server 104 generates reports regarding the overall or specific performance of any or all of printing system(s) 105 or any components thereof. These reports can consist of any data retrieved from database 118 and thereby include the status of the printing system 105 at certain time periods and/or whether the components or products met a particular benchmark, environmental conditions and the like. For example, one such report may include details about a component's status or productivity during a certain time period (e.g., how often a benchmark was missed over the last 30 days). These reports can then be used by a user 102 or other users identified by user 102 for internal purposes such as a tool to help the user improve or increase their business (e.g., asses the efficiency of certain products) or for more official purposes such as reports to meet certification requirements about a device or product (e.g., International Standards Organization (ISO), or other industry organization). Additional reports that can be generated for user's wishing to purchase a particular product, system, or component. The report could include details about the functionality of the item at users' sites provided to insure that the value of the item products is understood by the user purchasing such item. For example, a report or view can be generated regarding the paper a user/customer is choosing to purchase and how consistent it has been to allow the customer to appreciate the benefit of using certain paper or plan to improvise around the issues that may have occurred. In an embodiment of the present invention, the server also generates a report for the technical support staff to allow them to better understand what resources may further assist future users.

Additionally, from display 800 a user 102 can measure and monitor print system 105 by clicking or selecting icon 817. When clicking or selecting icon 817 user 102 is prompted to begin the measurement of the monitor. In order to measure the color, the user places input measurement device 109 which in this situation is preferably a calorimeter which measures the light absorbed on the monitor or a spectrophotometer that measures the light absorbed at varying wavelengths and affixes the measurement device 109 as is known in the art on top of the color box displayed on the monitor. The color is then read and its information stored 110 and 119. Examples of devices that can be used to measure such color from a monitor includes Eye-One Colorimeter measurement or the Monaco Optix devices manufactured by X-RITE Inc., although other input measurement devices made by other manufacturers can be used as well.

In another embodiment of the present invention, a widget application is also included in user 102's interface which allows a user to monitor their systems. A widget application generally is an interactive virtual tool that provides information for a user showing the user the latest news, the current weather, a dictionary, a map program or a language translator, among other things. The widget application can be implemented under one of the industry standard formats such as Apple's MacOSX Dashboard Widget, Microsoft's Vista sidebar Gadget, or the Konfabulator (Yahoo! Widget engine). In the present embodiment the widget is preferably shown on a user 102's computer screen and acts as a tool on the users desktop which is readily accessible and can operate without negatively impacting the user's normal use of their computer. The widget display provides up to date information on the current status on the devices that are being monitored and allow the user ready access to websites for more in depth information about the device. and also allows the user 102 to connect to websites that show information about the problem or error being experienced. The widget is created using known computer programming languages such as HTML, XML, CSS, JavaScript, and Objective C. Additionally, Adobe Flash, or other multimedia development tools and resources can be used to refine the widget to allow the user 102 additional multimedia options. In an embodiment of the present invention, the widget display can be color-coded to show the severity of any errors in the print systems being monitored. For example, a print system listed in red can mean that a severe condition exists because there were more than a certain number of read errors in the last 24 hours, a yellow listing can indicate that a severe condition existed in the print system in the last two days, and a green listing can indicate that there has not been a severe condition in the last two days. Additionally, the user can click or select any particular listing from within the widget application and get more detailed information about the error that has occurred. This widget application can be designed in numerous ways as is known in the programming art and can show the user 102 various degrees of information about the print system and errors that have occurred over the last set period of time.

Figure 4:
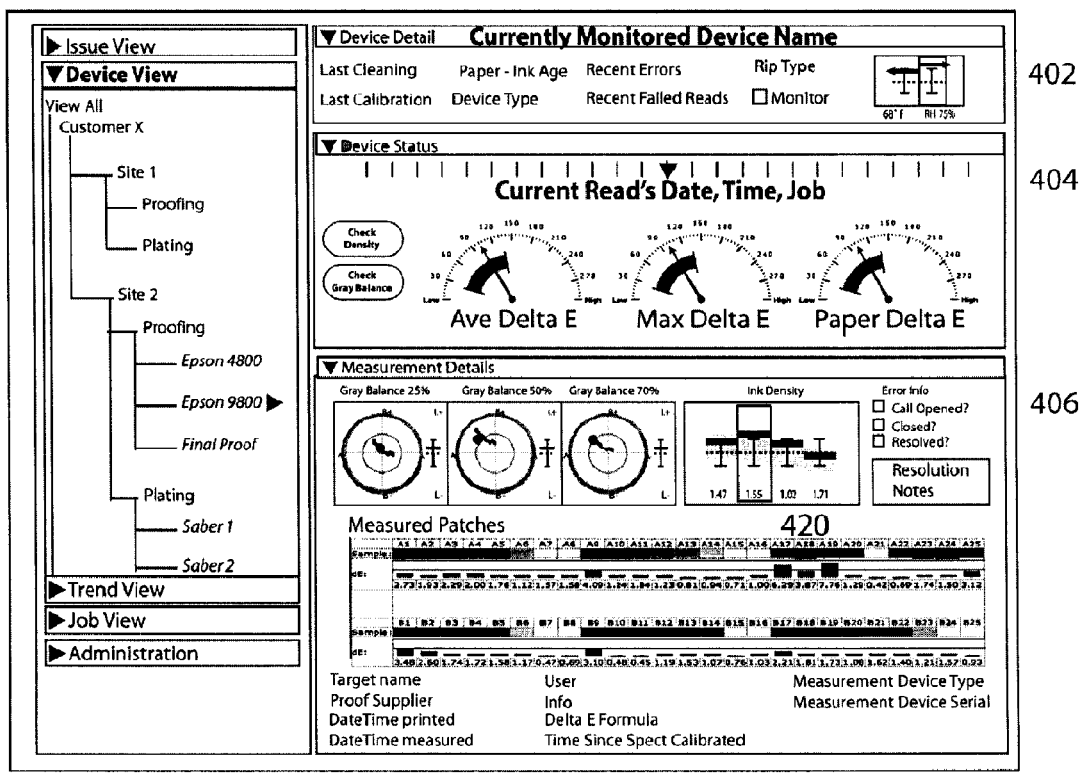
FIG. 4 is a user interface according to an embodiment of the present invention.

As is shown in FIG. 4, in an embodiment of the present invention, a user 102 is shown a "dashboard" display 400 that allows the user 102 to monitor the readings from the printing system 105 in real time. The display 400, preferably contains a device detail pane 402 which shows information about the monitored devices last cleaning time, last calibration time, paper and ink age, device type, or recent errors for example. Display 400 also contains a device status pane 404 which has a metered display showing gauges that depict certain criteria of the measurements for the device being measured. This criteria can include density, print contrast, paper quality, dotgain, or other measurements. Display 400 also preferably contains a measurement details pane 406, which shows details about the measurements taken from the device such as gray balance or ink density in a graph form as will be discussed below in reference to FIG. 5. Additionally, in measurement detail pane 406, specific colors of patches that have been measured can be shown to give user 102 a live view of the color measurements taken as well as a Delta E (dE) number that allows a user skilled in the art to view the read color values alongside the measured patches. As is known in the art, Delta E is the generic name for total color difference, and is used to indicate total color difference for all uniformed color spaces. Total color difference is a single number that expresses the magnitude (e.g., size, degree, amount) of the difference between two colors, although the value tells you nothing about the nature of the color difference.

Figure 5:
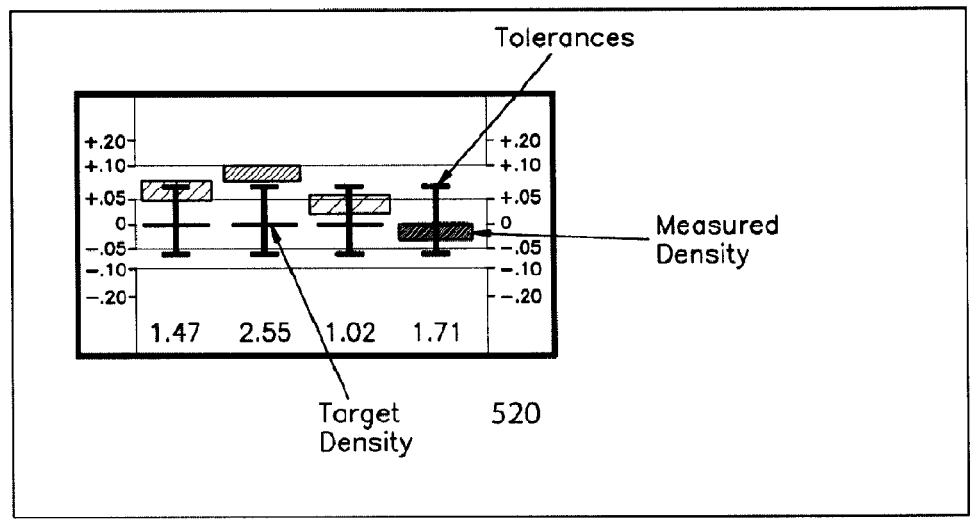
FIG. 5 is a graph according to an embodiment of the present invention.

As shown in FIG. 5, a normalized graph 520 is created for user 102 to show different ink densities compared against a zero level tolerance which is specific for each measured attribute or property. Thus, although the actual values for the different measured properties may be different, the graph displays them all based on a zero level scale so as they can be compared to each other. For example, if a measured density of 1.71 is 0.05% below a normal value for attribute A and 1.02 is 0.05% greater than a normal for attribute B, the 1.71 reading will be shown below the "normal" line on the graph and the 1.02 reading will be shown above the "normal" line on the graph even though 1.71 is greater than 1.02. Values and types that are measured include density, dotgain, gray balance, print contrast and effective print trap. In order to normalize the values, for each attribute, an acceptable value is set as "a zero value" and tolerances are set both above and below that value. Once the "zero value" is set, the values are graphed in comparison to such zero value and are shown in the graph.

For instance, density values can be displayed on the graph as actual density measurements or as a percentage range from 0-100%. To translate the graphs to a zero-value graph, the desired percentage value is used as the zero position within the chart or graph and depending on the reading, the read values are graphed accordingly. In order to translate density values to be displayed as a percentage, the values are converted using the Murray-Davies equation as is known in the art to convert the dot value from the density measurement. The Murray Davis Equation is Dotgain=$(1-10^{-((D(t)-D(n))}/1-10^{-(D(t)-D(100))})\times 100 - N$ where D(t) is the measured density of a 0% dot, D(100) is the density of a 100% dot, and D(n) is the density of the measured dot.

In another example, dotgain, which is the difference between the actual printed dot and the ideal halftone dot, can also be shown as a percentage range from 0-100%. Gray balance, on the other hand, is expressed as a lab value in which the target is the zero point of the chart and the deviation is plotted in relation to the center point. Print Contrast, which is a calculated ratio value derived from 100% density to a predefined percentage value, is displayed where the target is the zero point of the chart and the deviation is plotted in relation to the center point. Effective Print Trap, which is another measured attribute is a calculated ratio value derived from the solid density of two primary colors using the Preucil Equation, as is known in the art and is displayed where the target is the zero point of the chart and the deviation, is plotted in relation to the center point. Trap is an indication of the ability, or inability, of a printed ink to accept the next ink printed compared to how well paper accepts that ink. Factors influencing Trap include ink film, thickness, ink tack and viscosity, ink printing sequence, and the mechanical adjustments press such as rollers and impression settings. The Preucil Equation is Trap=$(D_{OP}-D1)/D2$ where Dop is the density of a two color overprint, minus paper density, D1 is the density of 1st primary color, minus paper density and D2 is the density of the second primary color minus paper density.

Figure 5A:
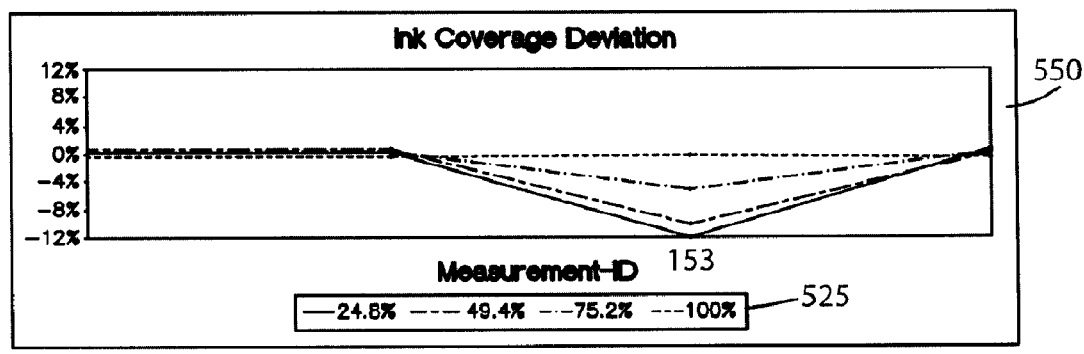
FIG. 5A is a graph according to an embodiment of the present invention.

Another example of a normalized gain according to an embodiment of the present invention is shown in FIG. 5A. As can be seen in FIG. 5A, ink coverage deviation for four different properties are plotted on the same graph 550. Box 525 shows the normal values for each of the four plotted properties which can either be set by a user or based on a known benchmark. Once the normal values and the high and low values for each property is known, the properties are plotted on the graph based on each property's zero value. Thus as seen on the graph, the property whose normal value is 24.8% is shown to be 12% its normal value at reading the time of reading 153 and the property whose normal value is 75.2% is shown to be 4% below its normal value at the same time. Thus, even though the normalized values for the properties are not identical they can be shown in one graph, making it easier to compare the deviation for each property.

Figure 2:
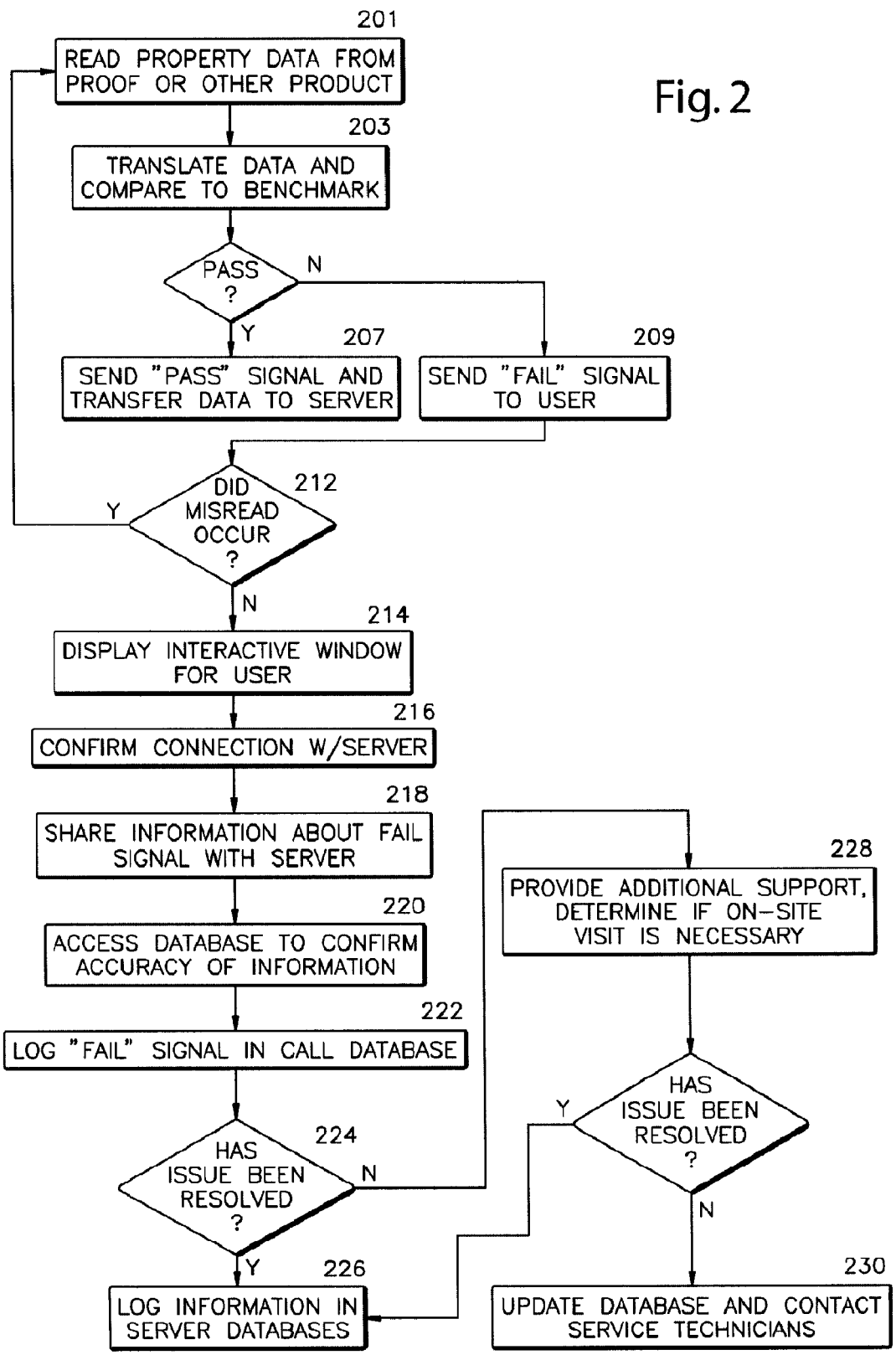
FIG. 2 is a flowchart illustrating the operation according to an embodiment of the present invention.

FIG. 2 shows generally the process by which a user of a printing system 105 that encounters an error condition in one of the components of the printing system 105 can help diagnose the problem as well as bring the condition to a proper solution. At first, data about a property related to a proof or other product produced by the printing system is read using any of a few well-known techniques, such as using a measurement device or scanner to measure or scan the product. As was discussed above, although the process is described in FIG. 2 regarding property data, a similar process can be carried out for monitoring a computer or other device located at a user's location.

Before data can be verified or an error condition determined "benchmark" data is stored. Benchmark data describes an acceptable condition of a physical property related to a product or a device 106. This acceptable condition is established when the product or device is in proper operational condition. The benchmark data is created and measured by using a target or test bar that has known values. This target is imaged on the specific product or device and then this target is measured using a device that can read the target from specific product or device. This measurement is a set of numbers that can describe the benchmark condition and is then placed in database 110. As was discussed above regarding FIG. 11, the benchmark data also can include a set of tolerances that can be the same for all values within the benchmark data, or different tolerances for particular data points within the benchmark data. The tolerance describes the acceptable variability of the product.

For example, information can be read from the proof by means of a color bar. A color bar is a printed strip of specific color patches that reference specific benchmark values. This printed strip can be placed on every proof being produced by the particular printing system 105. The color bar consists of multiple color patches that consist of different color values, which can be created and changed by a user or technical consultant. The color bar can be changed to fit the needs of the user and/or device being evaluated. The color bar can be read by using a device called a spectrophotometer, which is a device that has the ability to read color by capturing the spectral values reflected back to the device. The spectral values are then used to calculate other values that the benchmark data is based on. Step 201. Once the data about the property or machine is read from a proof or other product, the processor 107 translates that data and compares it to benchmark data (e.g., acceptable spectral values or ranges) that has previously been stored in database 110. Step 203.

After benchmark data is established and a subsequent product is produced in normal production that has the same target that was imaged when creating the benchmark data, data verification can be performed. The target is measured for a particular property and a set of numbers is generated that reflects the condition of the current product. These numbers from this subsequent measurement are sent to the processor 107 and compared to the benchmark data stored in the database 110. The measured data may also be stored in the database 110. If the values compared to the benchmark match the benchmark data or fall within the tolerances set around the benchmark data, the comparison data is considered to be acceptable. Alternatively, the server 104 can receive the measured data and compare it to the corresponding benchmark.

For example, if the acceptability of a printing plate is being measured, the process of creating benchmark data from the printing plate is to first check to make sure the process of imaging and processing the plate is repeatable and operating to manufacturer specifications. Once a known repeatable condition exists, a plate is imaged with a specific target, which has grayscale dot values. This grayscale target may have multiple data points, such as 5%, 25%, 50%, 75%, and 95%. These values are considered the digital file values. After the plate is imaged and processed with the grayscale target, the data is gathered from the target with a digital plate dot meter. The digital data dot meter reads the data at each of the points from the target. These values read from the target are then considered the measured values and are placed in the database 110 with the file values and the measured values together, and marked as the benchmark or acceptable data. Once the printing plate is being imaged in normal production, any or all of the plates are imaged to include the grayscale target. Such imaged plates would then be read using the digital dot meter, and these subsequent measured values are placed into the database. These measured values are then compared to the benchmark stored in database 110. The measured value, if within the tolerances set by the user, is then classified as acceptable. For instance, if the benchmark value is 7% and a tolerance is selected of plus or minus 1%, a data point can read 6%, 7%, or 8% and that reading will be deemed acceptable.

As can be seen further in FIG. 2, if the comparison of the property information to the benchmark matches, or in other words if the information falls within an allowable range, a "pass" signal is sent to the printing system, indicating that the property that was being tested fell within the acceptable benchmark range and therefore that property was acceptable. Upon issuance of a "pass" signal, the data is automatically transferred via the network to the server 104 and that information is stored in the server's database 118. Step 207. As will be explained in more detail below, the information sent to the database 118 is later used by the server 104 to track the operability and status of the printing system 105 that sent the signal.

If, however, the comparison of the measured property information to the benchmark stored in database 110 does not fall within the allowed benchmark range, a "fail" condition is indicated to the user 102. Step 209. This fail condition would be shown according to an embodiment in display 800. It should be appreciated that depending on which property is being tested; the importance of that property, and the importance of that property to the particular user the range of an acceptable value for the property can be adjusted. For example, if a particular user is not as concerned with a particular color property in their end-product, the range of appropriate property benchmark values for that particular color in the database can be quite broad. Conversely, if a particular color property is quite vital to an end product, the range for that particular property will be narrowed or even require an exact match. Thus, user customization (e.g., through a GUI) is obtainable.

If the processor 107 has indicated a "fail" condition, the system attempts to ensure that the fail condition was not caused by a failure in the hardware or improper input by the user and that the proof or product was read properly. Thus, processor 107 will also test to determine whether there was a misread. Isolating misreads either by device or user error insures that the "error" is isolated before any unnecessary queries or corrective steps are taken.

In general, when a property is tested, each test of a property has a certain known number of data points that need to be read and returned to the software 108 residing on processor 107 to create a result. If the correct number of data points is not returned, a misread condition is raised and a display notice would appear for the user indicating that it is possible that a misread has occurred and directing the user how to adjust the hardware that is charged with reading the property so as to compensate for the misread. Step 212. If however the software 108 has determined the correct number of data points have been returned, each data point of the property data is then compared to the data point values stored in database 110. If each data point is within the pre-defined benchmark range(s) (i.e., each data point is defined a different value or a single static value), a correct read condition will be determined and processing will continue. If a data point(s) and its tolerance value do not match, a misread condition is raised. In this instance, a display notice would be shown to the user indicating the possibility of a misread and directing the user how to adjust hardware charged with reading the property so as to compensate for the misread. Input device errors, such as mis-calibration, device communication failures and the like, may additionally be discussed through specific data point comparisons (like extreme white point, or black point, variations) or receipt of communication data that is nonsensical, such as when data is expected in a specific form (e.g., ASCII, HEX.) and it is returned in a form not expected or improperly formed. These steps can be repeated numerous times in order to ensure that a "fail" signal was not improperly identified.

Figure 3:
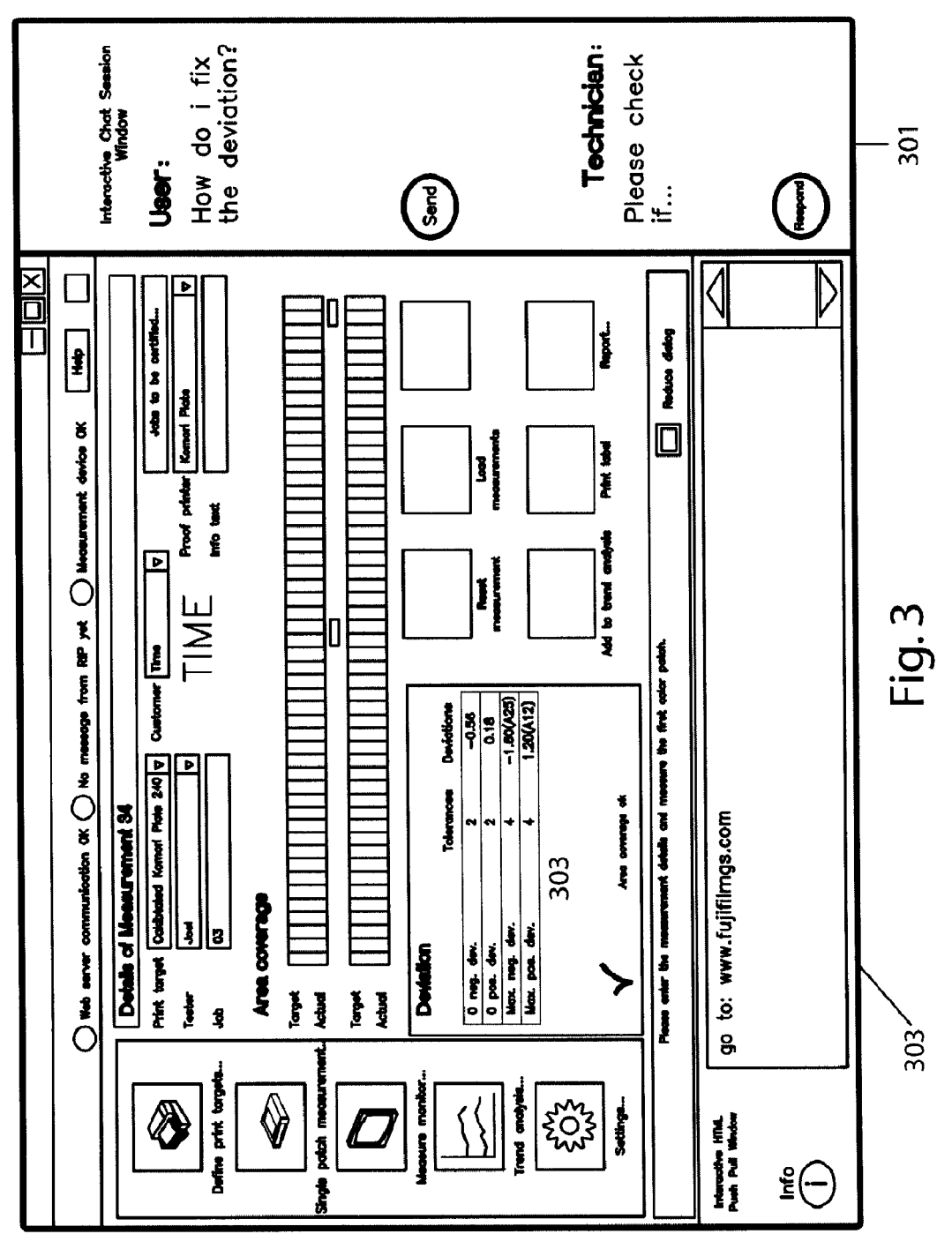

Once it is determined that a "fail" signal was properly issued, an interactive window as shown in FIG. 3 is displayed for the printing system user. Step 214. As can be seen in FIG. 3, interface 300 is displayed as an interactive window, which in the present embodiment contains three panes. The first pane is an interactive chat pane 301, the second pane 302 displays an interactive window which allows the user to view a list of automated responses and the third pane 303 displays detailed information related to the measurements taken. In another embodiment, additional information including information about automated responses can also be shown to the user in pane 302.

For example, if a user receives a "fail" signal, and the "fail" signal is representative of a particular error code that the color paper has a color value outside of the set limits, the interactive service window 300 displays the most common occurrences for the color value going out of range (e.g., incorrect paper loaded, paper loaded incorrectly). This information is retrieved from the local database 110 and displayed for the user. Detailed information regarding the measurements and automatic responses will be retrieved from the database 110 and/or databases 118 and 119 and displayed in pane 302 and 303, such as, data about the deviation and links to websites that discuss the proper paper needed for a particular printing component and/or instructions about loading the paper correctly. In an embodiment, an interactive chat pane 301 will also begin a chat session with a technical support technician letting the printing component user know that while he or she is checking on the automated responses from pane 302, the support technician can answer any individualized questions that the user had in this chat environment. Additionally, the technician could direct the user to follow the responses pane 302 and reassure the user 102 that there is a technician that will also research their issue. It should be noted that although described as an interactive chat pane, this communication window can also utilize any known communication methods such as e-mail, chat, instant messaging, video, voice and the like. The user's automated response pane 302 allows a user to go through the most common reasons for a particular error without having to reach out to a service representative and gives the user the ability to find a quick solution to a problem without having to advance to another level of support.

It should also be appreciated that the interactive chat window 301 can be eliminated and/or used in a more limited manner depending upon the service level agreement that the user has with the technical support staff as well as depending upon the time of day (e.g., allowing use only during normal business hours). For example, two different users can have different service levels in which, the interactive chat window 301 can be used for one user while a second user purchasing a lesser service plan will be limited to automated responses in pane 302 and a detailed explanation of those responses in pane 303 but will not be allowed to interactively chat with a service support technician. Alternatively, a user could be charged based on the number of times the interactive service is used or can use the chat ability to answer any technical questions even if no error exists.

In the present embodiment, the automated responses in pane 302 and 303 are based on data in databases 118 and 119 of the server 104. Thus, for example, as the system encounters more error codes from other users, the automated responses become more educated and allow the system based on prior history to populate responses that are more helpful to the users. It should be appreciated that based on the history of different components of printing systems 105, the system is able to create what amounts to a "smart query" which makes the automated responses more accurate based on prior history. The "smart query" is built from information from local database 110 on processor 107 and through communications with database 119 on server 104, in which the automated responses are found and sent back to the processor 107 and displayed for the user through the interactive service window 300.

For instance, when a property fails to match a defined benchmark or condition, the failed property with data, including, for example i) the time of last output from device, ii) calibration information, iii) temperature and humidity (or other environmental) readings, iv) the user who was running the device and v) the recent trend data received from the printing component(s) or system packaged with the specific data that caused the failure as a query for the remote database 118. The query causes a search on the information stored about the particular printing type of component(s) or printing system received from all users of the system 100. As there is no user interaction to describe what or why the error was caused, this query does not need to be formed in natural language which would then need to be deciphered to determine the correct search as in other knowledge based type searches. This query will be formed in the structure and definition of the database 118 which will provide the greatest accuracy in finding matches closest to the failed condition. This smart query will then provide a "tier one" type support, where the greatest number of issues are user errors, user maintenance issues, or problems and issues that are relatively well defined/documented, such as how the user is maintaining their system (e.g., last time the ink heads were cleaned, the last time the paper was changed, the last device calibration). Additionally, by capturing specific conditions when an error occurs the knowledge in the database will be increased as to how systems fail and methods to improve or provide better recommendations for product handling and specification. In other words, remote database 118 stores all of the characteristics measured during an error condition. At a later point when a new error is detected, the new measured characteristics are compared with the stored ones and if a match occurs, a possible solution can be recommended based on past history.

Once the interactive service window 300 is displayed for the user, the system confirms that the user's processor 107 has communication to the server 104. Step 216. If communication is intact with the server 104, the information about the "fail" signal is shared with the server 104 and the databases 118 and 119 on the server. Step 218. The database 119 is then accessed to confirm that the automated responses in automated response pane 302 are current by reviewing the most current data stored in the database 118 and, if not, to update those responses with additional resolutions in an effort to increase the usefulness to the user of the printing system. Step 220. Once the information about the "fail" signal is received by the server 104, the server proceeds to log a "fail" signal in a call database 120 and opens up a service call for that user 102. Step 222. It should be noted that this call database allows the server 104 to track open service calls, which allows the provider of the system 100 to better serve its users. If communication with the server 104 cannot be established, the user 102 is notified that the server 104 will not be able to access any of the data presently on the printing system and is advised to contact the service center directly to allow a support technician to handle the error. The data about the error will still be stored in local database 110 so the support technician can have all the necessary information to try and diagnose the cause for the error.

At the same time that the user 102 is utilizing its interactive service window 300 and reviewing the automated responses received in pane 302 technicians that can access the server 104 can begin reviewing the data received about the printing system 105 and determine whether any additional support is necessary. Alternatively, if the user 102 does not want to go through the automated responses, a service support technician at the server location can use the data received by the server to suggest possible solutions either via interactive chat pane 301 or by telephone. A determination is then made by the server 104 whether the issue has already been resolved through performance of all the prior steps. This determination can be made through various known methods including an affirmative input by the user 102 through an interface. Step 224. If the issue has been resolved, it is logged in the call database 120 located on the server 104 and database 119 is updated with the information as to how the issue or error code was resolved so that data is available for later "smart queries". Step 226. In other words, the solution that worked is associated with the data collected so when an identical issue arises later, the solution has already been found.

If, on the other hand, an on-site service call is necessary the need for a service call is logged in the call database 120 and service support technicians are contacted. Step 230. It should be noted that the process discussed above allows the user of a printing system to access the information available to and compiled by the server 104 and the databases 118 and 119 at the server 104 for numerous users to help troubleshoot an existing problem that the user might have on its printing system. It should be appreciated that permission levels can be added to the information in database 118 and/or database 119 to allow different users different levels of access/authorization to the information in the databases based upon the service level agreement that the user has with the technical support staff, as well as other criteria set by the support staff.

At the same time that a user is troubleshooting their issues at the printing system site, a technical support representative who is better qualified to handle a more detailed issue is able to investigate whether a second level of support is necessary. Thus, both time and effort are saved by allowing the user of the printing system who is already at the printing system site to handle the first level of support where very little or no expertise is necessary while allowing those trained in the technical support of such components to have the information necessary at their disposal to diagnose the cause of the error while simultaneously having already ruled out the most common causes of a particular issue. Moreover, at the same time, the databases are continuously updated making the automated responses reviewed by the user at the location the most up to date and the common causes for a particular error or complication.

As was mentioned above, in an embodiment of the present invention, a user 102 may have a server or other computers located at their location which can be similarly monitored. This computer system can be an internal network at the user 102 location or individual computers for a particular user. In the case of monitoring a computer or network, the properties of such machines that are monitored can include for example, the name and model of the machine, the number of processors, the processor speed, the number of cores on the machine, the memory size, the bus speed, the network connection, the network size or other known properties of a computer that the user would need monitored. Similar to the way print attributes are stored in database 110, monitored attributes about individual computers, servers or a network can also be stored in database 110 and the system 100 can thereby alert the user 102 if an attribute goes below a certain value or goes out of a tolerance range.

In the present embodiment, the attributes of the computer or network can be monitored using software that is installed on such computer. One such software suite that can be used to monitor the computers is the LandDesk Management Suite 8.7 manufactured by LandDesk Inc. Once the monitoring software detects an error, the information read from the machine is sent via network 103 to Server 104 where the data is stored in database 118. The system 100 then searches its databases based on historical data for this machine to generate a listing of the most likely resolutions for this error condition. An interactive chat window, similar to the one discussed above with reference to FIG. 3 is then opened for the user to suggest possible solutions to the error. If the issue is resolved through the possible solutions offered in the chat interface, the results are logged in call database 120. If on the other hand the issue is not resolved and an on-site service call is necessary, the need for a service call is logged in the call database 120 and service support technicians would be contacted.

Those skilled in the art will recognize that the method and system of the present invention has many applications, may be implemented in many manners and, as such is not to be limited by the foregoing embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present invention covers conventionally known and features of those variations and modifications through the system component described herein as would be understood by those skilled in the art. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

The invention claimed is:

1. A system for generating resolutions to errors with print systems, the system comprising:
   a first print system comprising a first printing device, first color reading device, and first software client;
   a second print system comprising a second printing device, second color reading device and second software client;
   a server in communication with the first print system and the second print system;
   a first database connected to the server for storing first monitored color data read using the first color reading device from a proof generated by the first printing device at the time an error condition occurs;
   a second database for storing solutions related to error conditions generated by the first print system associated with the color data stored in the first database;
   a third database for storing second monitored color data read using the second color reading device from a proof generated by the second printing device at the time an error condition occurs;
   one or more processors operative with software to:
   perform a first comparison of the color data stored in the third database with the color data stored in the first database, when an error condition exists in the second print system;
   perform a search of the solutions in the second database based upon the first comparison;

communicate a solution to the error condition in the second print system to a user of the second print system utilizing the second software client based on the search.

2. The system of claim 1 wherein the first database, second database and third database are the same database.

3. The system of claim 1 wherein the first and the second monitored color data is a color value.

4. The system of claim 2 wherein the color value is gray balance.

5. The system of claim 1 wherein the first and the second monitored color data relates to density.

6. The system of claim 5 wherein the first and second monitored color data is print contrast.

7. The system of claim 1 wherein the first and second monitored color data relates to the first print system's output quality.

8. A method for remotely monitoring a print system comprising a printing device with a printing plate, a plate reading device, at least one database and a software client comprising the steps of:

generating a benchmark for the printing plate;

reading data from the printing plate using the plate reading device;

generating a message at the software client indicating whether the read was successful;

translating the data read by the plate reading device;

storing the translated data in the at least one database of the print system;

communicating the translated data to a remote server system that comprises one or more databases using a communication channel;

storing the translated data in at least one of the databases of the server system;

comparing the translated data with the benchmark to generate a first comparison value;

generating a signal that alerts a user of the print system to a first condition when the first comparison value exceeds a certain pre-defined value;

sending such signal via the communication channel;

comparing the first comparison value with a plurality of stored comparison values to generate a second comparison value;

proposing a solution via a chat interface generated by the software client to the user of the print system based on the second comparison value.

* * * * *